United States Patent [19]
Fimoff et al.

[11] Patent Number: 5,914,962
[45] Date of Patent: Jun. 22, 1999

[54] MPEG TRANSPORT MUX FOR INDEPENDENTLY CLOCKED TRANSPORT STREAMS

[75] Inventors: Mark Fimoff, Hoffman Estates; Andrew E. Nunns, Naperville, both of Ill.

[73] Assignee: Zenith Electronics Corporation, Glenview, Ill.

[21] Appl. No.: 08/671,464

[22] Filed: Jun. 27, 1996

[51] Int. Cl.[6] ........................................ H04J 3/04
[52] U.S. Cl. ............................. 370/538; 370/516
[58] Field of Search ........................ 370/395, 535–545, 370/358, 543, 389, 428, 412, 411, 413, 415, 416, 417, 429, 516, 517, 503; 348/442, 441, 497, 500, 489, 387, 469, 423, 419, 412, 415, 425, 384

[56] References Cited

U.S. PATENT DOCUMENTS

| | | | |
|---|---|---|---|
| 5,122,875 | 6/1992 | Raychaudhuri et al. | 370/522 |
| 5,216,503 | 6/1993 | Paik et al. | 348/390 |
| 5,398,241 | 3/1995 | Witchey | 370/391 |
| 5,566,174 | 10/1996 | Sato et al. | 370/468 |

Primary Examiner—Dang Ton

[57] ABSTRACT

An MPEG multiplexed data transmission system accepts data from N program sources that are asynchronous and that have different data rates and multiplexes them into a common data stream. N buffers corresponding to the N program sources are provided along with a filler buffer that supplies a filler MPEG data packet when none of the N buffers includes a complete packet of data. An algorithm is described that modifies the fullness of the individual N buffers by a factor that comprises the program rate multiplied by an empirically determined constant K. The arrangement optimizes jitter introduced by multiplexing the programs.

35 Claims, 4 Drawing Sheets

MPEG TRANSPORT MUX FOR INDEPENDENTLY CLOCKED TRANSPORT STREAMS

BACKGROUND OF THE INVENTION AND PRIOR ART

This invention relates generally to data transmission systems and particularly to data transmission systems that use MPEG 2 encoded data streams.

The environment of the invention is a plurality of program sources, each of which transmits an MPEG (Motion Picture Experts Group) 2 transport stream, representing a single program running at a data or byte rate that is substantially constant, but different from the byte rate of any other program. Further, the system is entirely asynchronous, i.e. the clock signal that generates the byte rate of any particular program is not locked to the clock signal of any other program. The problem is to multiplex the various streams of data onto a single path that has a fixed byte rate that is not locked to any of the program clock signals. The multiplexing arrangement should ideally be optimized for minimal jitter where jitter is defined as the variation in delay experienced by any program in the transmission of its data packets through the multiplex link. Jitter is undesirable because it requires the addition of expensive buffer memory in the receiver. The MPEG transmitter assumes that the transmitted data will undergo a constant delay on its way to the receiver. The MPEG decoder in the receiver will work properly only if it is supplied with data at a constant rate. Any delay variation in the transmission path is equivalent to a non constant delay and if it occurs, added buffer memory is required. This memory is used as an elastic buffer to smooth the received jittered data to the near constant rate required by the MPEG decoding circuitry. As jitter increases, the need for additional buffer memory increases.

The MPEG 2 type data transport system is a well-defined entity, composed of data packets, each containing 188 bytes. The prior art already has a product that multiplexes a number of MPEG 2 transport streams of differing packet rates, the clocks of which are locked together to a single stream in which the byte rate is also locked to those of the input signals. The present invention is directed to a system that will accomplish the multiplexing task with individual transport streams and a common multiplexing stream having different byte (or packet) rates and completely asynchronous clock signals.

OBJECTS OF THE INVENTION

A principal object of the invention is to provide an improved data transmission system.

Another object of the invention is to provide a novel MPEG multiplex system for use with a plurality of asynchronous data streams having differing byte rates.

A further object of the invention is to provide an MPEG 2 transport stream multiplexing system that optimizes jitter among the independently clocked transport stream sources.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
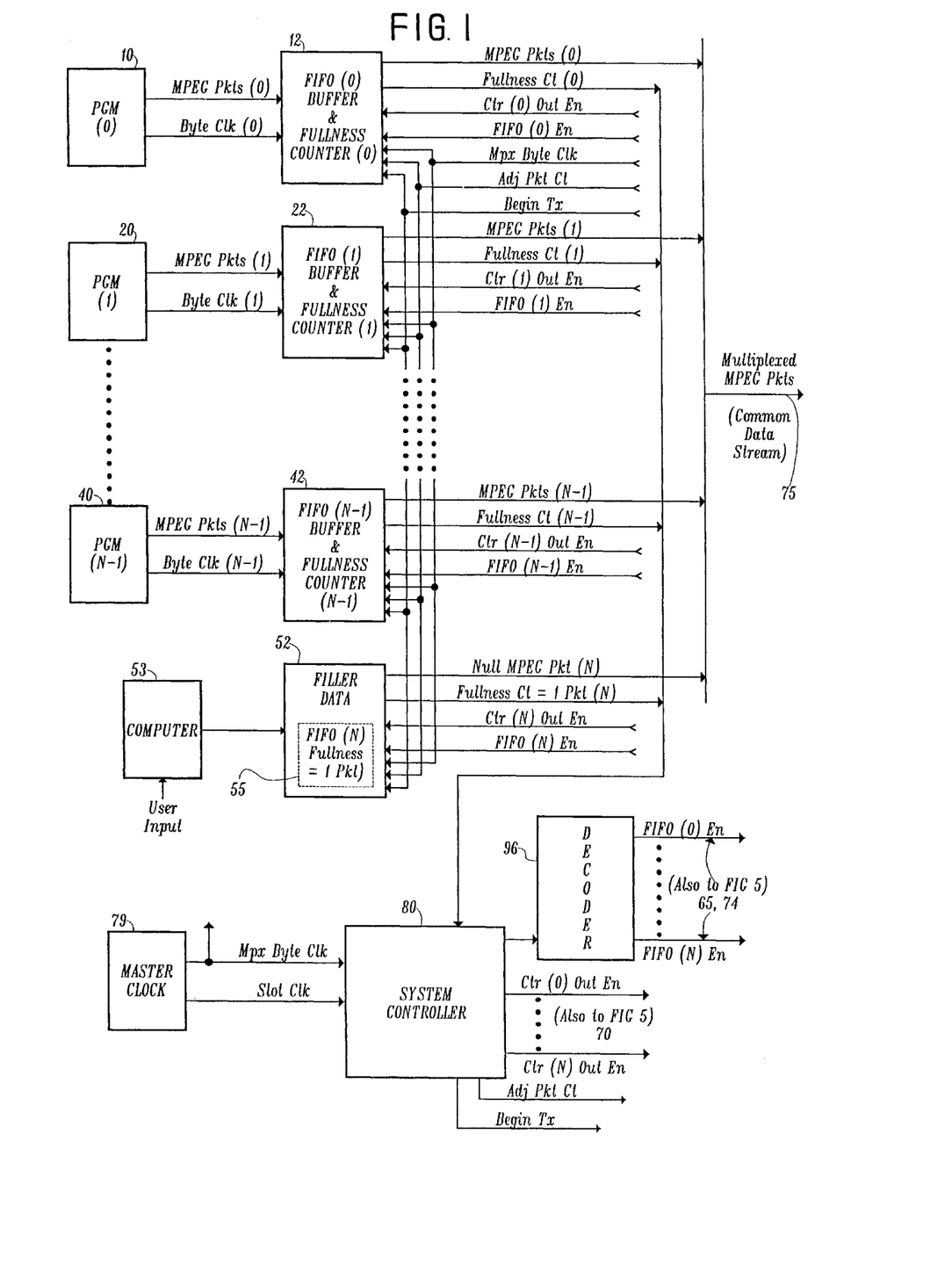
FIG. 1 is a block diagram of the MPEG transport multiplexing system of the invention.

FIG. 1 shows a multiplexer constructed in accordance with the invention in which N program (PGM) sources indicated as PGM (0), PGM (1) . . . PGM (N–1), are multiplexed to a common data stream 75. The reference numerals 10, 20 . . . 40 supply MPEG 2 transport packets (Pkts) to a corresponding plurality of first-in, first-out (FIFO) buffers (0), (1) . . . (N–1) and their associated fullness counters. As indicated, each program source has its own byte clock (ByteClk). These FIFO buffers and associated fullness counters are indicated by reference numerals 12, 22 . . . 42.

A filler data block 52 is shown coupled to a computer 53 that may receive user input. As illustrated in dotted line block 55, filler data block 52 may simply contain a FIFO (N) that holds a null packet which may comprise a ROM with no input that holds 188 bytes (one packet) of null data. The null FIFO version is the described embodiment of the invention. The null FIFO (N) supplies a packet of null data, as will be seen, to the multiplex line (common data stream) whenever none of the program FIFOs contains a full packet of data.

In a broader sense, no added data need be supplied to the multiplex line when there is less than a full packet of data in each of the program FIFOs. The multiplex slot may simply be left blank. Alternatively, as illustrated, filler data may be supplied, as required, to maintain the packet rate of the multiplex line. Such filler data may comprise non time sensitive data such as advertising, payment messages to customers, private messages, etc.

A master clock 79 provides a multiplex byte clock signal (MpxByteClk) and a slot clock signal (SlotClk) to a system controller 80. The SlotClk=MpxByteClk/188. System controller 80 supplies a state decoder 96 and provides counter output enable signals (Ctr(0 . . . N)OutEn) for each of the 0 to N counters. The system controller 80 also supplies an adjust packet count (AdjPktCt) signal and a begin transmission (BeginTx) signal. The state decoder 96 provides FIFO enable signals (FIFO(0 . . . N)En) to the N FIFOs. The system controller 80 also receives the fullness counts from each of the fullness counters in the N FIFOs.

Each of the 0–(N–1) FIFOs 12, 22 . . . 42 outputs the input MPEG packets to the common data stream 75 and its associated fullness count to system controller 80. N FIFO (52) outputs a null MPEG packet to the common data stream 75 and a fullness count equal to one packet to system controller 80. The fullness counts from the various FIFO/counter arrangements are supplied in response to a CtrOutEn signal being supplied to them, respectively. Each of the FIFO/counters receives the MpxByteClk, the AdjPktCt and the BeginTx signals.

Figure 2:
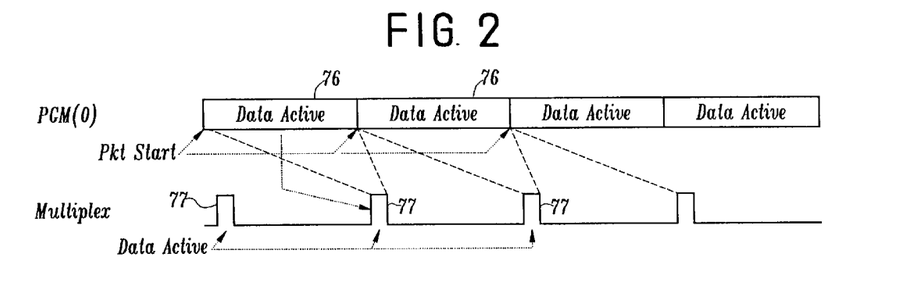
FIG. 2 indicates multiplexing of a program source to a common multiplex line.

FIG. 2 indicates the multiplexing of the packet of a single program [in this instance PGM(0)] to the common multiplex line or data stream 75. Only a single program source PGM(0) is assumed to be active for this illustration. The multiplex line can be thought of as containing a series of continuous slots at a fixed rate where each slot contains one packet. Each packet of data 76 is applied to a slot 77 in the common multiplex stream. It will be appreciated that slot 77 is only one of many slots in the multiplex stream. For example, assume in the simplified case illustrated that PGM(0) has a packet rate of 10 packets per second. Also assume that the common multiplex stream can accommodate 100 packets per second. This is equivalent to a slot rate of 100 slots per second. On the multiplex, data is output from FIFO(0) in a bursty manner, occupying $\frac{1}{10}$ of the available slots. (While the input to FIFO(0) is continuous, its output is in bursts.) These bursts are exactly evenly spaced because the packet rate of PGM(0) and that of the multiplex stream have an exact integral relationship. This is, of course, an idealized example. In reality the packet rate of any particular program will not have an integral relationship and not be locked to the packet rate of the common multiplex stream. In that event, each of the bursts will not be perfectly spaced in the common multiplex stream and will have some small time displacement (equal to some minimum number of slot times) from where it is supposed to be. Over time, a peak-to-peak time displacement in the packets for PGM(0) will be observed and this is referred to as peak-to-peak jitter (F). This jitter can also be viewed as an uneven spacing between packets for a particular program on the multiplex line.

In a practical situation, N will be greater than 1, and all of the programs will "compete" for slots on the common data line. This will result in additional jitter. As M, which is defined as the combined packet rate for the N streams, approaches the slot rate of the multiplex line, there will be more competition for slots and more jitter. As discussed above, it is important to minimize jitter because jitter creates a need for a larger buffer in the receiver. It is the multiplexing algorithm that decides which program gets the next slot in the multiplex line. Ideally the algorithm should keep jitter low and about equal over the group of input programs.

In determining jitter, the byte rate of the program is very important. Assume that the multiplexing process causes two programs, one with a rate of 2.0 Mbytes per second and the other with a rate of 0.2 Mbytes per second, each to be displaced in time (time jitter) from their nominal positions by 1 millisecond. While the time jitter for both programs is identical, the byte displacement (byte jitter) for the faster program is 2000 bytes whereas for the slower program it is only 200 bytes. The slower program is much more tolerant of the time displacement that the faster program. Therefore the multiplexing algorithm should cause the higher rate programs to suffer proportionally less time jitter that the lower rate programs. This will tend to equalize the byte jitter so that the buffer size needed in the receiver remains about the same regardless of the rate of the program being received.

One multiplexing approach (in the nature of a "round robin") is to check each FIFO at the beginning of each slot time until one with at least one full packet is found. If none is found, wait until the next slot time. If a packet is found, that packet is sent to the common multiplex stream and, at the next slot time, checking is resumed beginning with the next FIFO. With such a system, a packet entering a FIFO for any particular program may experience a small or a large delay before being sent to the multiplex stream. This delay is dependent upon the packet arrival time, the arrival time of packets for other programs and the checking order. This variation in delay will cause uneven spacing (jitter) for packets for a particular program on the multiplex line. Also there is no proportionality between the jitter and the rate of the particular program. Therefore high rate programs may experience the same amount of time jitter as lower rate programs. This can result in very severe byte jitter for the high rate programs.

A "time stamp" approach could also be used in which, upon arrival of a packet in a FIFO, it would be given a time stamp and at each time slot the packet with the oldest time stamp would be placed on the multiplex line. This approach has a negative impact upon a high data rate program that is being multiplexed with many lower data rate programs. For example, a packet for the high rate program may in one instance be sent to the multiplex soon after it arrives in its FIFO, but in another instance suffer a long delay because many packets for the lower rate programs have just arrived prior to the high rate program packet and it must wait for all of them to be sent to the multiplex line. This results in a large delay variation (jitter) incurred by a high rate program.

Another potential solution is described as follows. At each slot time examine all of the FIFO's. Of those FIFO's that contain at least one complete packet, choose the FIFO serving the highest byte rate program and send that packet to the multiplex line. The difficulty here is that when multiplexing a number of programs of about equal data rate, the program with the slowest data rate will always have the lowest priority and will always suffer a time jitter out of proportion to the relatively small rate difference among the various programs.

A better solution results if we argue that the fullness of a FIFO has an equivalence to potential jitter. Assume that during the multiplexing process, the fullness of a particular FIFO varies between 0 and F bytes. When there are F bytes in the FIFO, the oldest packet in the FIFO has been delayed by F bytes. Thus a FIFO whose fullness varies between 0 and F bytes has a delay that varies between 0 and F bytes. Therefore the peak-to-peak jitter is F bytes. It appears that multiplexing should try to equalize the maximum fullness (F) of all the FIFOs so as to equalize the peak-to-peak jitter F. (F for all of FIFOs should be about the same.) Also in equalizing F for each FIFO, F for any particular FIFO should not become unreasonably large, thus preventing any program from suffering large peak-to-peak jitter.

An algorithm that gives slot access priority to the program with the fullest FIFO tends to equalize FIFO fullness for the programs and thus to equalize the peak-to-peak byte or packet jitter incurred by each program.

In accordance with the above, the FIFO with the largest amount of data, in excess of one packet would place one packet on the multiplex line. If none of the FIFOs had at least one packet, then a null packet would be supplied to fill the slot in the common stream. The empirical results of such an approach indicate a bias against the higher rate programs, with the higher the packet rate, the more jitter the program experiences. This bias occurs because the packet rate of the higher rate programs is closer to the slot rate than the packet rate for lower rate programs. The effect of the FIFO delay variation being quantized in slot times is proportionally more significant for higher rate programs since a delay variation of one slot time for a high rate program involves many more bytes than a delay variation of one slot time for a low rate program.

A further improvement to reduce the effect mentioned above is to multiply the FIFO fullness (in excess of one packet) by the program byte rate. This overcomes the bias against higher rate programs, but to such an extent that it creates a bias in favor of the higher rate programs.

The preferred form of the invention adds to the FIFO fullness count a factor consisting of the number of additional bytes that will enter the FIFO one slot time in the future multiplied by an empirically determined constant K. This calculation is performed at each slot time. The FIFO that achieves the highest result (score) will send a packet of data to the multiplex line. If the fullness count for a FIFO is less than 188 bytes (one packet), its score is set to 0 because only complete packets can be sent to the multiplex line. The preferred approach provides a reasonable advantage to the higher rate programs but not so drastic an advantage as that incurred by simply multiplying the FIFO fullness by the program byte rate. The number of bytes that will enter the FIFO for a particular program in a slot time can be loaded into a microcontroller at initialization if all of the program byte rates are known. Alternatively, the microcontroller can note the fullness increase of each FIFO from one slot time to the next and calculate the byte rate of each program. The selection of K is dependent upon how close the combined packet rate of all of the programs being multiplexed is to the packet rate of the multiplex line. The constant K can be chosen automatically by first setting it to an initial value of one, commencing the multiplexing process while the microcontroller notes the peak-to-peak jitter F incurred by each program and adjusting K in either direction until it optimizes jitter, i.e. finds the best equalization of the peak-to-peak jitter F for the programs.

It should also be noted that it is not essential that the byte rates of the programs being multiplexed be exactly constant so long as the variation in the byte rate is not great from one slot time to the next.

Figure 3:
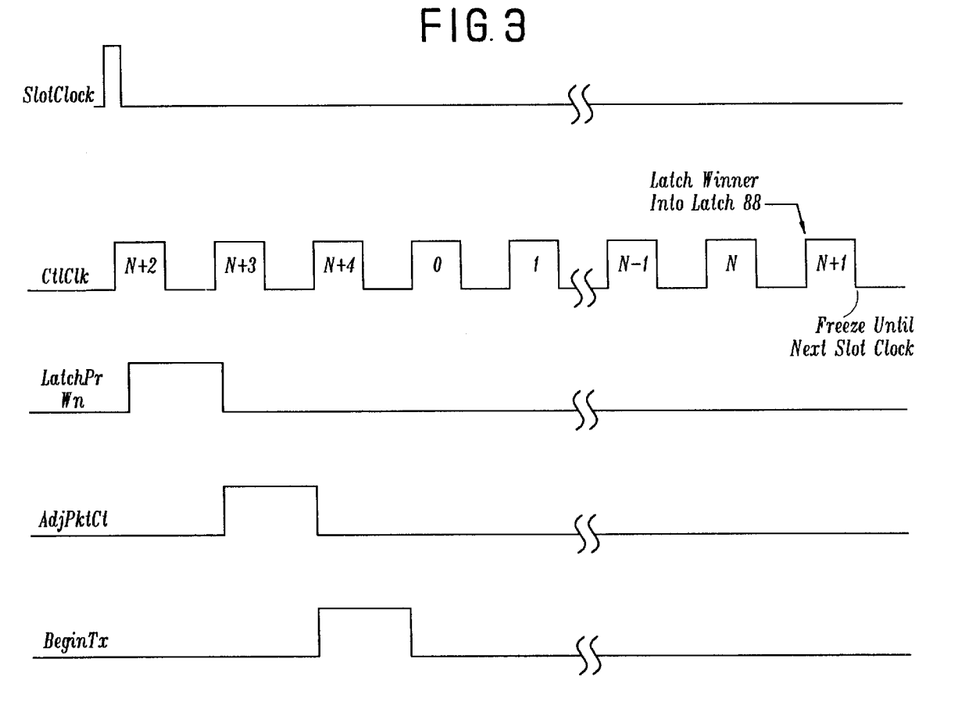
FIG. 3 is a series of waveforms illustrating timing for the system of the invention.

In practicing the invention, the priority calculations are performed prior to the determination of which program is to be supplied next to the multiplex line. The preferred embodiment involves establishing various states by a control clock (CtlClk) that is initiated by SlotClk. As indicated in FIG. 3, these states are characterized by N+2, N+3, N+4, 01 and −1 and N+1 where the CtlClk is frozen until occurrence of the next SlotClk and N is equal to the number of programs being multiplexed. A latch prior winner (LatchPrWn) signal is established at the beginning of state N+2 and continues to the beginning of state N+3. The AdjPktCt signal is established at the beginning of state N+3 and terminated at the beginning of state N+4. The BeginTx signal is established at the beginning of state N+4 and terminated at the beginning of state 0.

Figure 4:
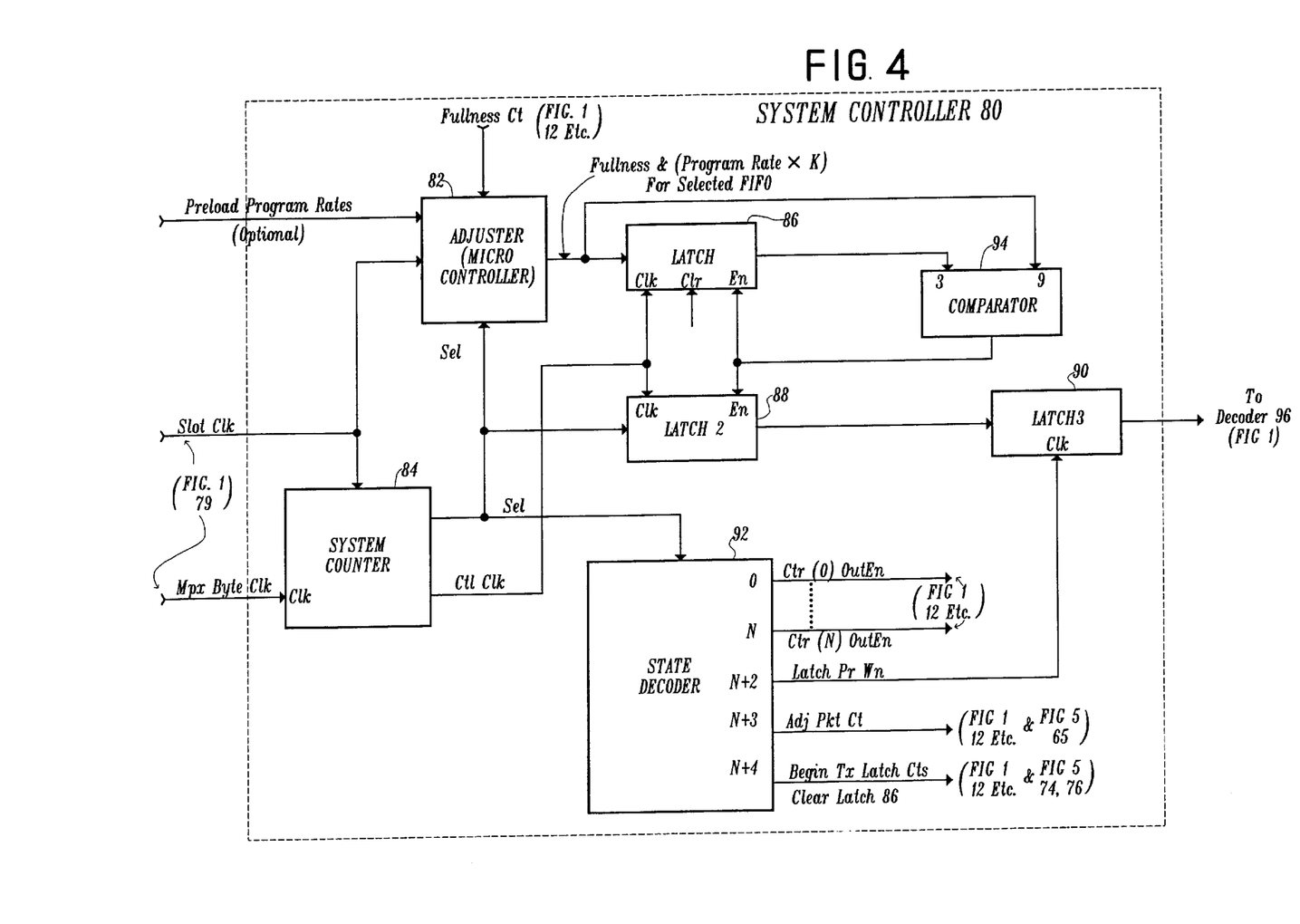
FIG. 4 is a block diagram of the system controller of FIG. 1.

FIG. 4 shows system controller 80 in more detail. It includes an adjuster, in the form of a microcontroller 82, a system counter 84, a first latch 86, a second latch 88, a third latch 90, a state decoder 92 and a comparator 94. One input to adjuster 82 is the fullness count from the FIFO counters. A preload of the program rates for the various program sources is indicated as an optional connection. The SlotClk signal is supplied to the adjuster 82 and to system counter 84 and the MpxByteClk signal is applied to system counter 84. System counter 84 supplies a select (SEL) signal to adjuster 82, to latch 88 and to state decoder 92 and supplies the CtlClk signal to latches 86 and 88. The adjuster 82 develops the score which is the buffer fullness (in excess of one packet) plus a factor comprising the program byte rate multiplied by constant K for each selected FIFO and supplies the score to latch 86 and to comparator 84. The output of latch 86 is supplied to the other input of comparator 94 and the output of comparator 94 supplies the enable inputs of latches 86 and 88. The output of latch 88 is supplied to latch 90 along with the LatchPrWn signal from state decoder 92. The output of latch 90 is supplied to decoder 96 (FIG. 1).

Figure 5:
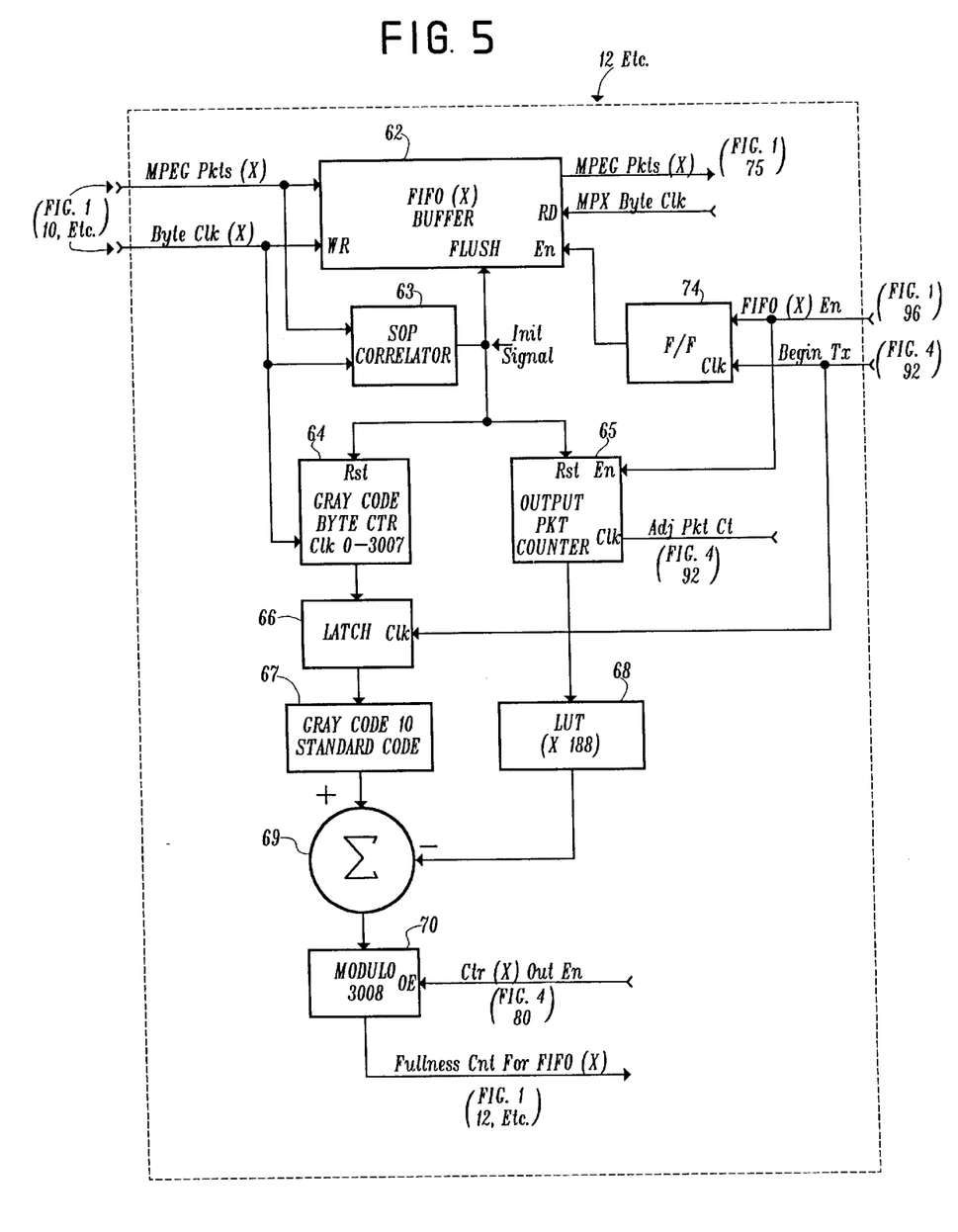
FIG. 5 shows the details of a FIFO buffer and corresponding fullness counter used with the invention.

FIG. 5 is a more detailed depiction of any of the FIFO buffers and counters 12, 22 and 42. The FIFO buffer (X) identified by reference character 62 is enabled by a signal from a flip/flop (F/F) block 74 that is supplied with the FIFOEn and BeginTx signals. An SOP (start of packet) correlator 63 is coupled to the flush input of FIFO buffer 62 and to the reset terminal of a gray code byte counter 64 and an output packet counter 65. The output of gray code counter 64 supplies a latch 66 that in turn is coupled to a gray-code-to-standard-binary-code converter 67 which feeds the positive input of an adder 69. The output of packet counter 65 is coupled to a look up table (LUT) 68 which, in turn, is coupled to the negative input of adder 69. The output of adder 69 is coupled to a modulo converter 70 which develops the fullness count for the FIFO buffer. The modulo converter 70 is operated in response to the CtroutEn signal from system controller 80 (FIG. 4).

In operation, the adjuster 82 (FIG. 4) adds to the fullness count (FIG. 5) from the selected fullness counter (FIG. 1) the number of bytes that the selected FIFO will receive in one slot time of the common data stream (multiplex line) multiplied by factor K. This is the score for that FIFO. If the fullness count is less than 188 bytes, the adjuster 82 will give the FIFO a score of 0. As indicated, the number of bytes received in one slot time can be preloaded to adjuster 82, or can be calculated by observation of the microcontroller in adjuster 82. For the case of the null FIFO, which receives no data, the number of bytes received in one slot time is 0. Therefore its score will always be 188. The factor K is preferably determined as previously indicated. The score comparison (FIG. 4) is driven by system counter 84 and is reset to zero by the SlotClk. In response to each MpxByteClk, system counter 84 establishes the states, 0 to (N+4) and freezes itself until the next SlotClk. The system counter SEL output is re-encoded so that 0 to (N+4) becomes (N+2), (N+3), (N+4), 0, 1 . . . (N), (N+1). The system counter outputs the SEL signal to state decoder 92 which generates the sequence of CtrOutEn signals followed by the LatchPrWn, AdjPktCt, and BeginTx signals. Prior to changing state, system counter 84 also produces a CtlClk signal just prior to entering states 0 . . . (N+1). The system controller 80 goes through a sequence of operations or states that repeat every slot time. The sequence is initialized by the SlotClk and driven from state to state by the MpxByteClk. When the final state is reached, the system counter 84 freezes until the next SlotClk.

Assume initially that the previous slot time has just ended and during that time a number has been latched in latch 88 representing the winning FIFO for the current slot (FIFO with highest score). The SlotClk starts the process by initializing the system counter 84 to state (N+2). This enables the LatchPrWn signal to latch a pointer to the winning FIFO for the current slot from latch 88 to latch 90 which results in a FIFOEn signal to the winning FIFO via state decoder 96 (FIG. 1). At state (N+3), the AdjPktCt signal is enabled to reduce the fullness count of the "winner" FIFO counter by one packet. At state (N+4) the BeginTx signal is enabled, causing the current scores of all FIFOs to be latched for the next slot contest and also causing the winning FIFO to begin to transmit one packet to the multiplex line. At this time, latch 86 is cleared to zero.

System counter 84 establishes state 0 next. This begins a series of comparisons in which the latched fullness count for each FIFO is, in turn, enabled onto a tri state bus and input to the adjuster 82, converted to a score by the adjuster 82 as previously explained, and compared to a latched value in latch 86 that represents the score of the FIFO with the highest score of those checked so far. If the fullness of a FIFO is less than 188 bytes (1 packet), adjuster 82 sets that FIFO's score to 0. The winning score of each comparison is saved in latch 86 and the number of the winning FIFO is saved in latch 88. The comparisons are repeated through state N which compares the score of the null FIFO, which is always 188 as previously explained, with the greatest score of all the other FIFOs. After system counter 84 reaches state (N+1), it freezes until the next SlotClk. The entry into state 0 begins the first comparison between the score of FIFO (0) and the 0 value residing in latch 86. The score of FIFO (0) is enabled to comparator 94 for comparison against the contents of latch 86. If FIFO (0) has a score equal to or greater than the 0 value in latch 86, its score is latched into latch 86 and its pointer value is latched into latch 88 by the CtlClk occurring just prior to entry into state 1. This process is repeated through state N which compares the score of null FIFO (N) (always 188) against the largest score of the other FIFOs. Upon entry into state (N+1), latch 88 will hold a pointer to the FIFO with the highest score. That value will remain in latch 88 because system counter 84 is frozen until the next SlotClk. If all of the FIFOs 1 through (N-1) have less than 1 packet, their scores will all be 0, the null FIFO's score of 188 will be the largest and the null packet will be sent to the multiplex line. If any of the FIFOs 1 through (N-1) have at least 1 packet, its score will be greater than the score for the null FIFO because that FIFO's score will have to be greater than 188.

It will be appreciated that a similar operation occurs where the null FIFO takes the form of filler data that may be read out in packets under control of computer 53, for example. In the arrangement where no data is supplied to the multiplex line 75 when none of the FIFOs contains a full packet, no comparison is made with the null or filler data FIFO and the corresponding slot in the multiplex stream remains empty.

The fullness count is derived by using two counters. The Gray Code counter 64 counts bytes as they are input to the FIFO. A gray code count is used because the count value is sampled asynchronously by the BeginTx signal. As is known to those skilled in the art, the gray code insures that the latched value will be accurate to within one byte and prevents the latching of unreliable data present during a counter transition. The latched result in latch 66 is converted to standard binary code in converter 67 and supplied to adder 69. The output packet counter 65 counts packets and is incremented by the AdjPktCt signal whenever a packet is supplied from its FIFO to the common data stream 75. Its output is multiplied by 188, to convert it to bytes, and subtracted from the modified count provided by counter 64 to adder 69. The result is taken in modulo 3008 in modulo converter 70 to yield the current fullness in bytes of the FIFO (assuming that FIFO size=3008 bytes=16 packets).

At state (N+2), the LatchPrWn signal causes the FIFOEn signal to be applied to the winning FIFO. At state (N+3), the AdjPktCt signal results in a reduction of one packet in the fullness count of that FIFO. At state (N+4) the BeginTx signal causes that FIFO to begin transmission of a packet to the multiplex line 75. This also results in the latching of the input counter values for all of the FIFOs, which are processed with their respective multiplied output counter values, so that they are ready for the next slot contest. It should be noted that only the winning FIFO is enabled for transmission to the common data stream or multiplex line 75 (and have its output packet counter decremented by one packet) because all of the operations are qualified by the FIFOEn signal.

It is obviously desirable to remove only complete data packets from a FIFO whenever it wins a slot. To achieve this, the FIFO must be empty at some initialization point and filled starting with the first byte of a data packet. Then any 188 bytes later will mark a complete packet. If the input stream for the program is interrupted and reconnected for example, the FIFO must be flushed and refilled starting with the first byte of an incoming packet. This is done automatically using the SOP correlator 63 which involves a well known correlation technique that searches for a 47H pattern (the MPEG transport start byte of packet) that are spaced 188 bytes apart. At power up, the SOP correlator 63 searches for the 47H pattern while holding the initiate (Init) signal active to empty the FIFO and prevent it from accepting data. When the correlator has found the 47H pattern (with confidence) it releases the Init line at the next start of packet point so that the FIFO starts filling at a packet boundary. If the pattern is ever interrupted by data errors or a physical disconnect, the SOP correlator 63 will detect the absence of the 47H pattern spaced by 188 bytes and will assert the Init signal to empty and disable the FIFO. When the errors disappear or a physical reconnect occurs, correlator 63 again searches for and finds the packet boundary and releases the Init line.

What has been described is a novel technique for optimizing jitter in a multiplexed MPEG data transmission system where data is received from a plurality of asynchronous sources of differing program rates. It is recognized that numerous changes in the described embodiment of the invention will be apparent to those skilled in the art without departing from its true spirit and scope. The invention is to be limited only as defined in the claims.

What is claimed is:

1. A method of optimizing jitter in a data transmission system comprising:

receiving N asynchronous, substantially constant rate data streams of differing data rates in N buffers;

determining the fullness of a buffer by the amount of data in the buffer and the data rate of its corresponding data stream; and multiplexing individual packets of the N data streams to a common data stream having a constant packet rate S, that is equal to or greater than the combined packet rate M of the N data streams, based upon the determined fullness of the N buffers.

2. The method of claim 1, further comprising:

supplying a filler packet to the common data stream if none of the N buffers is sufficiently full.

3. The method of claim 2 wherein the buffer fullness value is the amount of data in the buffer added to a factor comprising the amount of subsequent data receivable by the buffer during a packet slot of the common data stream multiplied by an empirically determined constant K.

4. The method of claim 3, further comprising using a microprocessor to determine the constant K.

5. The method of claim 2, further comprising:

setting a constant K to a nominal value;

determining with a microprocessor the peak-to-peak jitter incurred by multiplexing each of the N data streams; and adjusting the value of the constant K to optimize peak-to-peak jitter among the N data streams.

6. A method of optimizing jitter in a data transmission system comprising:

receiving N asynchronous, substantially constant rate data streams of differing data rates in N buffers;

determining the amount of data in a buffer;

adding a factor to the determined amount of data in the buffer comprising the amount of subsequent data receivable by the buffer during a packet slot of the common data stream multiplied by an empirically determined constant K; and multiplexing individual packets of the N data streams to a common data stream having a constant packet rate S, that is equal to or greater than the combined packet rate M of the N data streams, based upon the fullness of the N buffers.

7. The method of claim 6, further comprising:

supplying a filler packet, as required, to supply data to the common data stream at the packet rate S.

8. The method of claim 6, further comprising using a microprocessor to determine the constant K.

9. The method of claim 8, further comprising:

setting the constant K to a nominal value;

determining with a microprocessor the peak-to-peak jitter incurred by multiplexing each of the N data streams; and adjusting the value of the constant K to optimize peak-to-peak jitter among the N data streams.

10. The method of claim 6, wherein each packet includes a start of packet signal and further comprising:

searching for a start of packet signal; and enabling a buffer to receive data only when a start of packet signal is present.

11. A method of optimizing jitter in a data transmission system comprising:

receiving N asynchronous MPEG 2 transport streams, representing single programs running at substantially constant, but differing byte rates and having a combined rate of M packets per second;

receiving the packets of the MPEG 2 transport streams in N buffers;

multiplexing individual packets of the MPEG 2 transport streams to a common data stream having a constant packet rate S, where S is equal to or greater than M, based upon received data in the N buffers, the data in each of the N buffers being prioritized on the basis of the amount of data in the buffers and the byte rates of the corresponding individual MPEG 2 transport streams; and providing filler packets, as required, to supply data to the common data stream at the packet rate S.

12. The method of claim 11 wherein the amount of data in each of the N buffers is modified by a term equal to the byte rate of the corresponding individual MPEG 2 transport stream plus an empirically determined constant.

13. The method of claim 11 wherein the amount of data in each of the N buffers is multiplied by the data rate of the corresponding data stream.

14. The method of claim 11 wherein the amount of data in each of the N buffers in excess of one packet is added to a factor comprising the amount of subsequent data receivable by that buffer during a packet slot of the common data stream multiplied by an empirically determined constant K.

15. The method of claim 14, further comprising using a microprocessor to determine the constant K.

16. The method of claim 14, further comprising:

setting the constant K to a nominal value;

determining with a microprocessor the peak-to-peak jitter incurred by multiplexing each of the N data streams; and adjusting the value of the constant K to optimize peak-to-peak jitter among the N data streams.

17. A method of optimizing jitter in a data transmission system comprising:

receiving N asynchronous MPEG 2 transport streams, representing single programs running at substantially constant, but differing byte rates and having a combined rate of M packets per second;

receiving the packets of the MPEG 2 transport streams in N buffers;

determining the amount of data in each of the N buffers in excess of one packet;

adding to the amount of data in each buffer a factor comprising the amount of subsequent data receivable by the buffer during a packet slot of the common data stream multiplied by an empirically determined constant K; and multiplexing individual packets of the MPEG 2 transport streams to a common data stream having a constant packet rate S, where S is equal to or greater than M, based upon the amount of received data in the N buffers.

18. The method of claim 17, further comprising:

providing filler packets, as required, to supply data to the common data stream at the packet rate S.

19. The method of claim 18 wherein the filler packets comprise null packets.

20. The method of claim 17, further comprising using a microprocessor to determine the constant K.

21. The method of claim 17, further comprising:

setting the constant K to a nominal value;

determining with a microprocessor the peak-to-peak jitter incurred by multiplexing each of the N data streams; and adjusting the value of the constant K to optimize peak-to-peak jitter among the N data streams.

22. The method of claim 18, wherein each MPEG 2 transport stream packet includes a 47H start of packet signal and further comprising:

providing a correlator for determining the presence of a 47H start of packet signal; and controlling buffer operation in response to the output of the correlator, whereby a buffer receives data only in the presence of a 47H start of packet signal.

23. An MPEG data transmission system comprising:

means for supplying N asynchronous, substantially constant data rate MPEG data streams of differing data rates, each of said N data streams including a plurality of data packets;

N buffers for receiving said data packets in said N data streams, respectively;

a common MPEG data stream having a constant packet rate S that is equal to or greater than a combined packet rate M of said N data streams; and means for multiplexing said packets of said N data streams to said common data stream based upon the fullness of each of said N buffers, said fullness of each of said N buffers comprising a value that is determined by the amount of data in the buffer and the data rate of its associated data stream.

24. The transmission system of claim 23, further including:

means for supplying a filler data packet; and said multiplexing means multiplexing said packets of said N data streams and said filler data packets, as required, to said common data stream based upon the fullness of each N buffers.

25. The transmission system of claim 23, wherein each of said data packets includes a start of packet signal and further including:

a start of packet correlator for determining the presence of said start of packet signal; and means for controlling the operation of said buffers to permit receipt of data responsive to said start of packet correlator.

26. The system of claim 24 wherein said common data stream has packet slots of constant duration, and further including means for determining said data rates of said N data streams, said fullness value being the amount of data in a buffer in excess of one packet plus a factor comprising the amount of subsequent data receivable by that buffer during the duration of a packet slot multiplied by a constant K.

27. The system of claim 26, further including:

a data counter for each of said N buffers;

microprocessor means for determining said fullness based upon the output of said data counter and said data rate for each of said N data streams; and timing means establishing time periods for comparing the fullness of each of said N buffers and for determining which of said N buffers is to supply data to said common data stream.

28. The system of claim 27 wherein said timing means comprises a state decoder, and further comprising:

a master clock for generating a slot signal for determining said packet slot duration and a multiplexing byte signal; and a system counter receiving said signals from said master clock and for supplying selection signals to said microprocessor means and to said state decoder.

29. The transmission system of claim 28, further comprising:

means for supplying a filler data packet;

said multiplexing means multiplexing said packets of said N data streams and said filler data packets, as required, to said common data stream based upon said fullness value, under control of said timing means.

30. The transmission system of claim 29, wherein said filler data packets supply null data packets.

31. An MPEG data transmission system comprising:

means for supplying N substantially constant byte rate data streams in the form of MPEG 2 data packets, said N data streams being asynchronous and of differing byte rates;

N FIFO buffers for receiving said byte packets in said N data streams, respectively;

a common MPEG 2 data stream having a constant packet rate S that is equal to or greater than the combined packet rate M of said N data streams;

means for establishing uniform duration slots in said common data stream;

a counter for each of said N FIFO buffers; and means for multiplexing said packets of said N data streams to said common data stream based upon the fullness of each of said N buffers, as indicated by the counts in their associated counters, said fullness comprising a value that is determined by the amount of data in a buffer and the byte rate of its associated data stream.

32. The transmission system of claim 31, further including:

means for supplying filler data packets to said common data stream under control of said multiplexing means.

33. The system of claim 32 wherein one of said filler packets is supplied to said common data stream when none of said N FIFO buffers includes a full packet of data.

34. The transmission system of claim 31, wherein each of said MPEG 2 transport stream data packets includes a 47H start of packet signal and further including:

a start of packet correlator for determining the presence of said 47H start of packet signal; and means for controlling the operation of said buffers to permit receipt of data responsive to said start of packet correlator.

35. The system of claim 33 wherein said fullness value is the amount of data in a buffer in excess of one packet plus a factor comprising the amount of subsequent data receivable by said buffer during a slot in said common data stream multiplied by a constant K.

* * * * *